United States Patent [19]
Drago

[11] Patent Number: 4,640,149
[45] Date of Patent: Feb. 3, 1987

[54] HIGH PROFILE CONTACT RATIO, NON-INVOLUTE GEAR TOOTH FORM AND METHOD

[75] Inventor: Raymond Drago, Glenn Mills, Pa.

[73] Assignee: The Boeing Company, Seattle, Wash.

[21] Appl. No.: 472,379

[22] Filed: Mar. 4, 1983

[51] Int. Cl.$^4$ ............................................. F16H 55/06
[52] U.S. Cl. ...................................................... 74/462
[58] Field of Search ...................... 74/462; 409/1.0, 12, 409/26, 51; 29/159.2

[56] References Cited

U.S. PATENT DOCUMENTS

| | | | |
|---|---|---|---|
| 1,525,642 | 2/1925 | Cox | 74/462 |
| 1,647,191 | 11/1927 | Norton | 74/462 |
| 1,977,749 | 10/1934 | Wildhaber | 409/26 |
| 2,128,815 | 8/1938 | Guest | 74/462 |
| 2,737,854 | 3/1956 | Acker | 409/12 |
| 3,251,236 | 5/1966 | Wildhaber | 74/462 |
| 3,631,736 | 1/1972 | Saari | 74/462 |
| 3,982,445 | 9/1976 | Rouverol | 74/462 |
| 4,276,785 | 7/1981 | Rouverol | 74/462 |

FOREIGN PATENT DOCUMENTS

| | | | |
|---|---|---|---|
| 843630 | 8/1960 | United Kingdom | 409/1 |
| 992863 | 1/1983 | U.S.S.R. | 74/462 |

OTHER PUBLICATIONS

"Advanced Transmission Component Development", 37th Annual Forum, American Helicoptor Society, New Orleans, LA, May, 1981.
"Design of High Contact Ratio Gears" American Helicoptor Society, New Orleans, LA., May, 1981 (37th Annual Forum).
Gear Drive Systems–Design and Application, by Peter Lynwander, pp. 43–47, Mar. 1983.
Gear Handbook by Dudley, 1962, Scientific Library, U.S. Patent and Trademark Office, pp. 7—4 and 7—5.

Primary Examiner—Rodney H. Bonck
Attorney, Agent, or Firm—Jones, Tullar & Cooper

[57] ABSTRACT

A gear tooth which has a combination of an involute and a non-involute profile, and specifically a constant relative curvature and a high contact ratio, i.e., a contact ratio which is at least 2.

5 Claims, 9 Drawing Figures

HIGH PROFILE CONTACT RATIO, NON-INVOLUTE GEAR TOOTH FORM AND METHOD

BACKGROUND OF THE INVENTION

1. Field of the Invention

This invention relates to gearing, and in particular to the profile of the gear tooth and method of generating same.

2. Prior Art

Considerable effort has been expended in the development and improvement of the standard involute tooth form. As a result, it has arrived at a point in its developmental life where significant improvements in capacity are extremely difficult and costly to achieve. In conjunction with and in many ways as an outgrowth of this development a variety of gear tooth forms have been presented in recent years, for example, the Cycloidal, Wildhaber-Novikov (W-N), the high sliding (HSG), the Evoloid, the high profile contact ratio (HCR), and the constant relative curvature (CRC). Each of these forms has its own advantages and disadvantages. The Cycloidal, (W-N) and (CRC) forms are truly non-involute, while the (HSG), (HCR) and Evoloid are essentially modifications to the basic involute. The Cycloidal and the (W-N) forms have been demonstrated to have limitations which, except for a very few unusual applications, make them generally unsuitable for high speed, high power applications. The (HSG) and the Evoloid forms are essentially similar in their basic concepts, i.e., each is a systematized method for extreme profile shifting utilizing standard involute profiles. Profile shifting, while relatively new to commercial applications, has been utilized for some time in the design of high capacity precision systems such as aircraft and helicopter transmissions. The (HSG) and Evoloid forms both shift profiles to such an extent that the resultant profile contact ratio is quite low, in fact, in many cases it falls substantially below unity. Because of the low profile contact ratio, both forms must generally be made as helical gears, thus introducing a thrust force which requires an additional bearing to be reacted. In addition, both gear forms have very high sliding velocities along the tooth profile. High sliding generally indicates both high scoring probability and lower surface fatigue life. Both of these forms provide a lower noise level and high reduction ratios than are generally practical with standard involute gears. However, their limitations as noted above are sometimes considered to outweigh these advantages.

The (HCR) form utilizes a basic involute form but changes are made to the addendum area, the tooth root, whole depth, pressure angle, etc., to increase the profile contact ratio from 1.2–1.35 which is typical of the standard involute gearing to 2 and above. The advantages of (HCR) gearing include lower stress levels per unit load (thus permitting greater loads to be carried without exceeding basic stress limits), lower noise and vibration levels, improved reliability, and generally smoother mesh action.

While the (HCR) profile has the advantages noted above, a major disadvantage is in the somewhat higher sliding velocities and slip ratios which occur, particularly in the pinion dedendum area, due to the extended contact length. The increased sliding gives rise to a real scoring hazzard to the gear tooth.

The (CRC) form is not generated from a base circle as is the involute tooth form which results in a constantly changing radius of curvature of the tooth profile. In the (CRC) form the radius is substantially constant as disclosed in U.S. Pat. No. 3,631,736. In this patent the three stated objects relate the desire to provide an improvement of the basic involute form in terms of its strength characteristics. The (HCR) form and its relationship to the basic involute form as a means of strength improvement are not mentioned although the (HCR) form was known in the relevant time period of this patent.

OBJECTS AND SUMMARY OF THE INVENTION

Through many years of refinement and improvements, standard involute gear teeth have reached a level in the state-of-the-art where it is impractical to expect significant increases in load carrying capacity through the continued use of existing design practices. The (HCR) profile is an improvement over the standard involute, but it presents a surface durability problem (high sliding velocities). There is a need for a new gear tooth profile, especially for a power gear tooth profile to meet the demands of, for example, future transmission designs.

It is an object of the present invention, therefore, to provide the state-of-the-art with a new gear tooth profile which will permit increases in strength and surface durability.

It is a related object of the present invention to provide the state-of-the-art with a new gear tooth profile which will permit lower noise and vibration levels, improved reliability and faster generally smoother mesh action.

It is another related object of the present invention to provide the state-of-the-art with a method of forming the new gear tooth profile.

It has been found that the invention can be achieved by combining for the first time both an involute form and a non-involute form, and specifically, the (HCR) and the (CRC) forms for gear teeth. Tests of the combined form have yielded surprising results and it is interesting to note that the sliding velocity for the combined forms is actually less than that for the standard involute form. The full effect of this reduction would still not be realized if the entraining velocity were substantially reduced. Surprisingly it was also found that the entraining velocity was not reduced, in fact it was increased in the areas of greatest relative sliding, that is at the tip and root. This increase in entraining velocity coupled with a reduction in the sliding velocity yields a substantial improvement in load capacity.

BRIEF DESCRIPTION OF THE DRAWINGS

Nine figures have been selected to more fully explain the invention to the person skilled in the art. These are.

DETAILED DESCRIPTION

Figure 1:
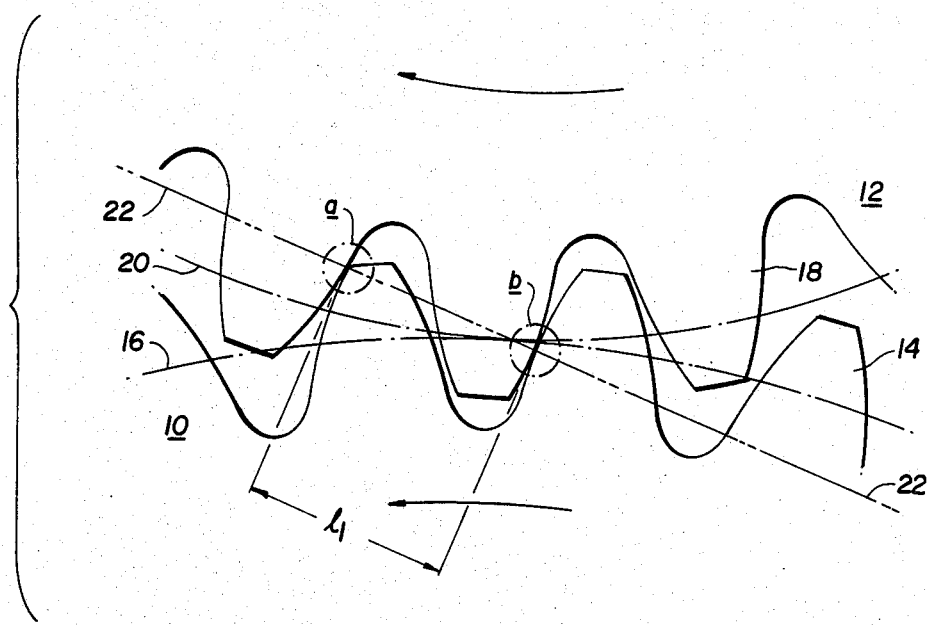
FIG. 1, which schematically illustrates a pair of meshing external gears of standard involute profile.
Figure 2:
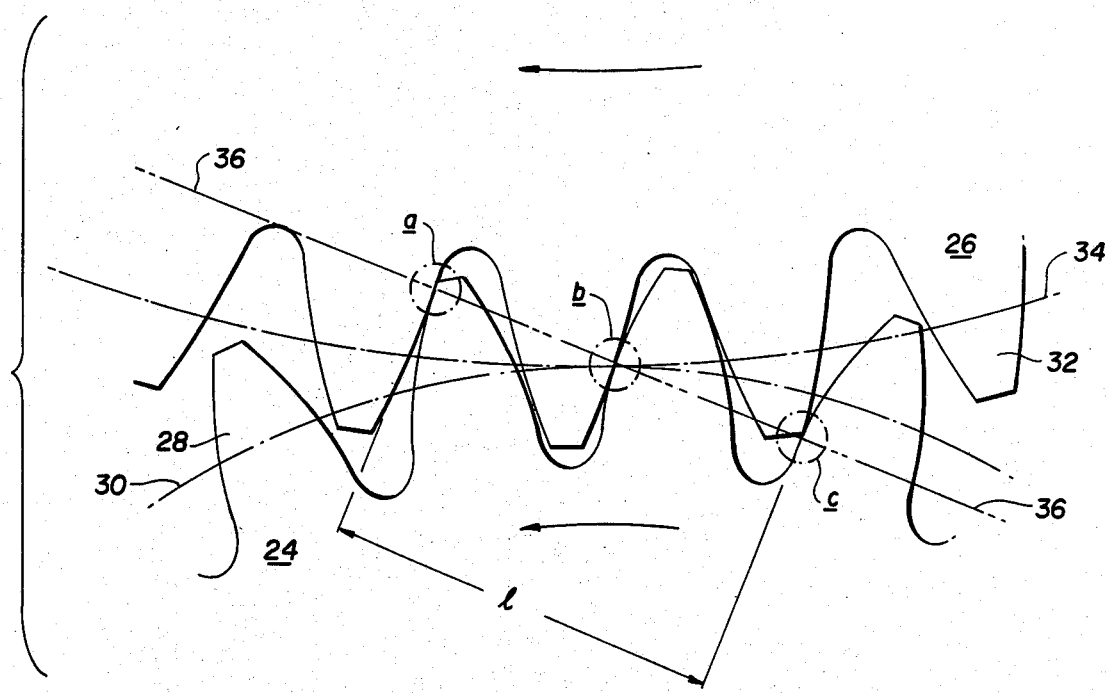
FIG. 2, which schematically illustrates a pair of meshing external gears of (HCR)-involute profile.
Figure 3:
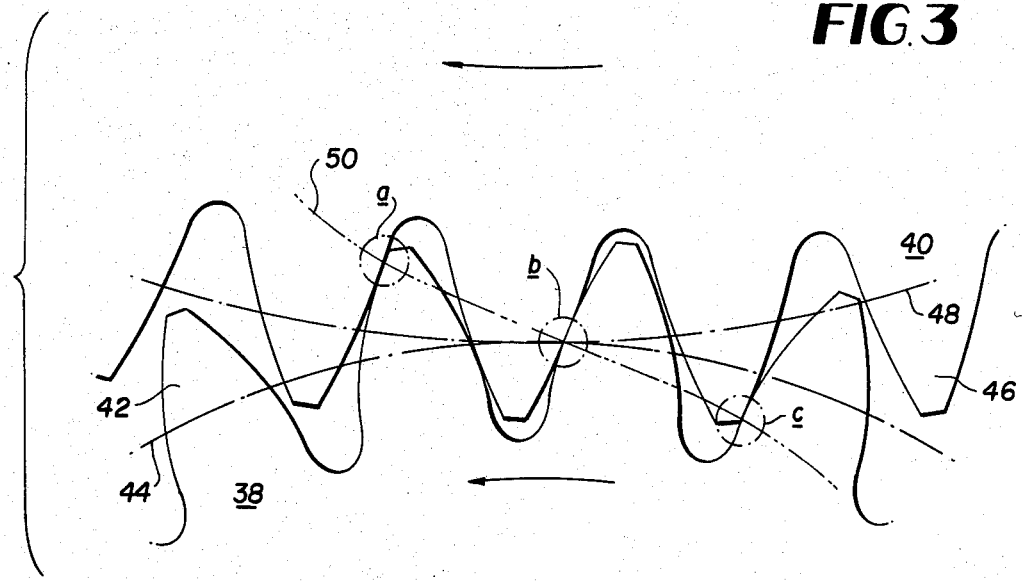
FIG. 3, which schematically illustrates a pair of meshing external gears of (CRC)-(HCR) profile.

FIGS. 1–3 illustrate the meshed condition of the standard involute tooth form (FIG. 1), the (HCR)-involute tooth form (FIG. 2) and the (CRC)-(HCR) tooth form (FIG. 3).

In FIG. 1, the pinion 10 has teeth 14 and a pitch circle 16, while the gear 12 has teeth 18 and a pitch circle 20. Both the pinion 10 and gear 12 contact each other along the path of contact 22, and as can be seen share the load among two pairs of teeth, at points a and b, for a short portion of the mesh cycle while one pair carry the total load for the remainder of the cycle. The maximum bending stress occurs when the tooth load is applied at the highest point of single tooth contact on the tooth flank. At this point, one tooth is carrying the full load, while all the remaining teeth are unloaded. The ability of a given design to resist tooth breakage depends on the magnitude of the maximum load on a single tooth, its point of application, and the gear material strength.

In FIG. 2, the pinion 24 has teeth 28 and a pitch circle 30, while the gear 26 has teeth 32 and a pitch circle 34. Both the pinion 24 and gear 26 contact each other along the path of contact 36, and as can be seen share the load among three pairs of teeth, at points a, b and c, for a short portion of the mesh cycle while two pair carry the total load for the remainder of the cycle.

Figure 4:
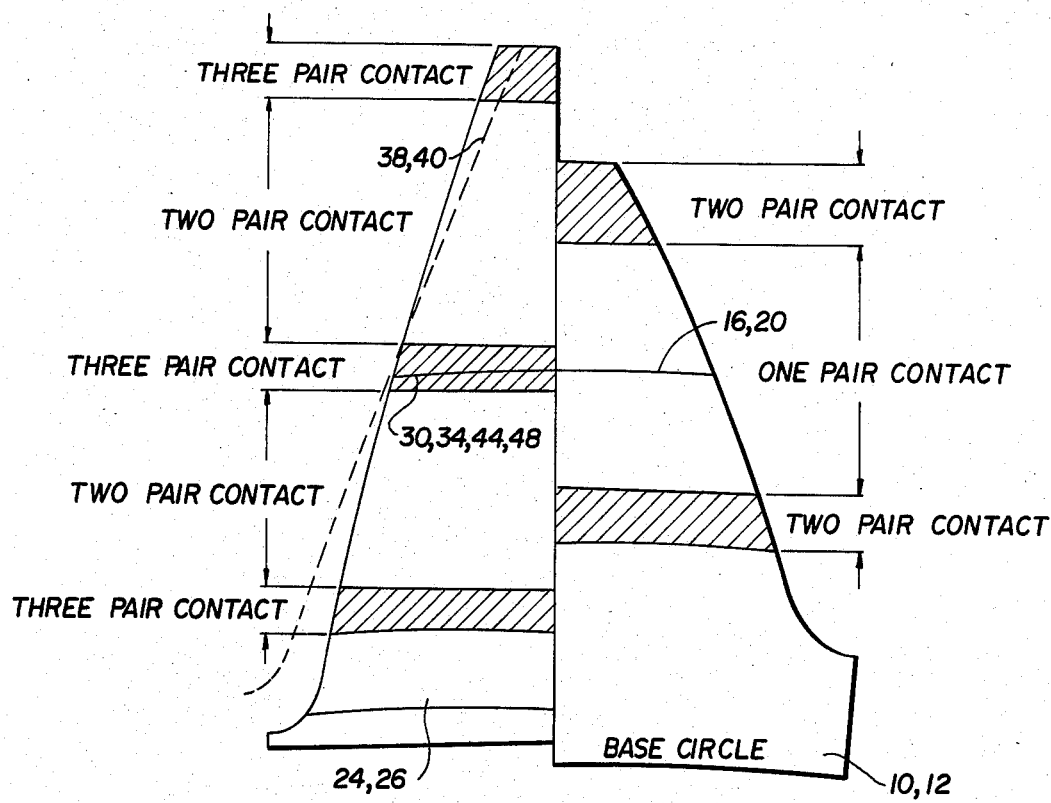
FIG. 4, which schematically illustrates a gear tooth comparison for standard involute, involute-(HCR) and a (CRC)-(HCR) profiles.

The gear teeth 28 and 32 have (HCR) involute-profile forms. Thus, for a high contact ratio gear set three pairs of teeth share the load during entrance and exit and in the vicinity of the pitch line. It has been determined that the maximum applied load on any given tooth is less than 65 percent of the load sustained on a single tooth of a standard involute configuration. In addition, the position of maximum load for a (HCR) design is applied in the vicinity of the pitch line as compared to the highest point of single tooth contact for a standard involute design. This results in a proportionally smaller moment arm for the (HCR) design, thereby resulting in lower bending stresses. To achieve the (HCR) design the tooth profile is extended sufficiently to increase the length of the active line of action. Compare FIGS. 1 and 2 where $l_1$, is shown to be less than $l$, respectively. Likewise, compare the tooth profiles in FIG. 4. Note also the contact regions on the two tooth profiles. The contact ratio is defined as the ratio of the angle of action to the pitch angle, where the angle of action comprises the angle of approach plus the angle of recession. A (HCR) gear is thus one in which the contact ratio is 2 or more.

The increased load capacity of a (HCR) gear is, of course, its most significant advantage. By increasing the number of teeth in contact, the maximum load which must be carried by any single tooth is reduced, thus for a constant stress level the (HCR) design will carry more load. Conversely, for a given load, the (HCR) set may be made with a smaller face width and thus lighter in weight. This sharing of load also reduces the magnitude of the dynamic engagement and disengagement loads to provide quieter, smoother action. The combination of lower tooth loading and load repositioning produces root bending stresses which have been found to be as much as 20 percent lower than equivalent standard involute teeth. Similarly, the reduced load spectrum along the profile results in a substantial reduction in contact stress.

The advantages of the (CRC) tooth form are delineated in the previously noted U.S. Pat. No. 3,631,736. The (CRC) tooth form is defined in this patent to be one having substantially constant relative curvature at each point of contact. The (CRC) tooth form is therefore a non-involute form. Nevertheless it is now suggested that the (CRC) tooth form be modified to a (CRC)-(HRC) tooth form. Such a tooth form is shown in FIG. 3. There pinion 38 is shown to include teeth 42 and a pitch circle 44, while gear 40 is shown to include teeth 46 and a pitch circle 48. Contact along the path of contact 50 is at three points a, b and c. This is similar to the contact shown in FIG. 2 for the (HCR)-involute. However, with the (CRC)-(HCR) tooth form the path of contact is not a straight line. This may account for the improvements realized with a (CRC)-(HCR) tooth form over the known tooth forms. The (CRC)-(HCR) profile, shown in partial outline in FIG. 4 can be generated using the equation noted in U.S. Pat. 3,631,736, namely:

$$\sin \phi = \sum_{n=0}^{\infty} (a_n \sigma^n);$$

and the following equation:

$$mp = \frac{\theta_{clc} - \theta_{cod}}{\frac{360°}{N}}$$

where:
mp = contact ratio
$\theta_{clc}$ = roll angle at the last point of contact of the (CRC) profile
$\theta_{cod}$ = roll angle at the outside diameter of the (CRC) profile
N = number of teeth By iteration with these equations to achieve a contact ratio of at least 2, the (CRC)-(HCR) tooth form can be generated.

Figure 5:
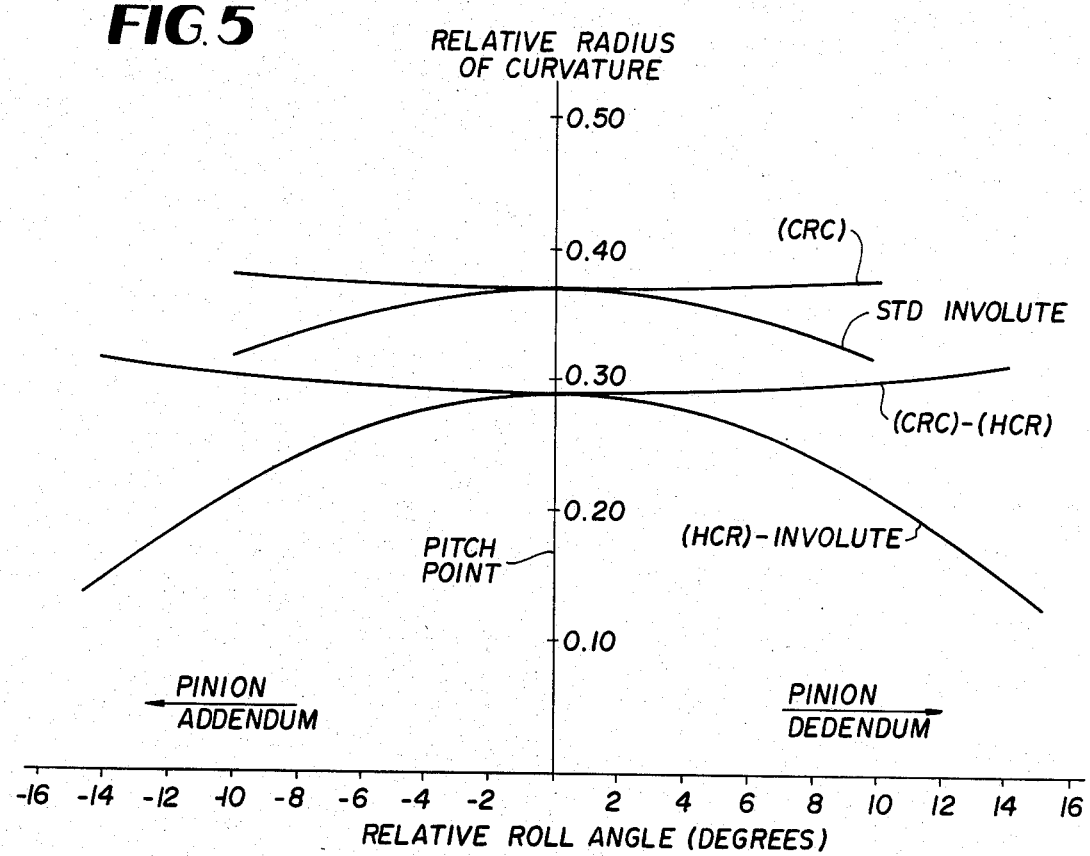
FIGS. 5–8, which are graphs illustrating comparisions between the standard involute, involute-(HCR), (CRC) and (CRC)-(HCR) profiles and relative radius of curvature versus relative roll angle (FIG. 5), sliding velocity versus relative to roll angle (FIG. 6), slide/roll ratio versus relative roll angle (FIG. 7), and entraining velocity versus relative roll angle (FIG. 8)

It has been demonstrated that the relative radius of curvature of the (CRC)-(HCR) profile increases for increasing relative roll angle (FIG. 5), whereas the relative radius of curvature of the (HCR)-involute decreases for increasing relative roll angle. The maximum relative curvature radius in all cases occurs at the pitch point and for both involute designs decreases toward the tip and toward the root. This result with the (CRC)-(HCR) profile was unexpected, especially in view of the results achieved with the standard involute and the (HCR)-involute, i.e., the (HCR)-involute follows the standard involute. This might reasonably have been expected with the (CRC)-(HCR) profile as against the (CRC) profile results. Instead, the (CRC)-(HCR) profile shows an increase, as noted.

Figure 6:
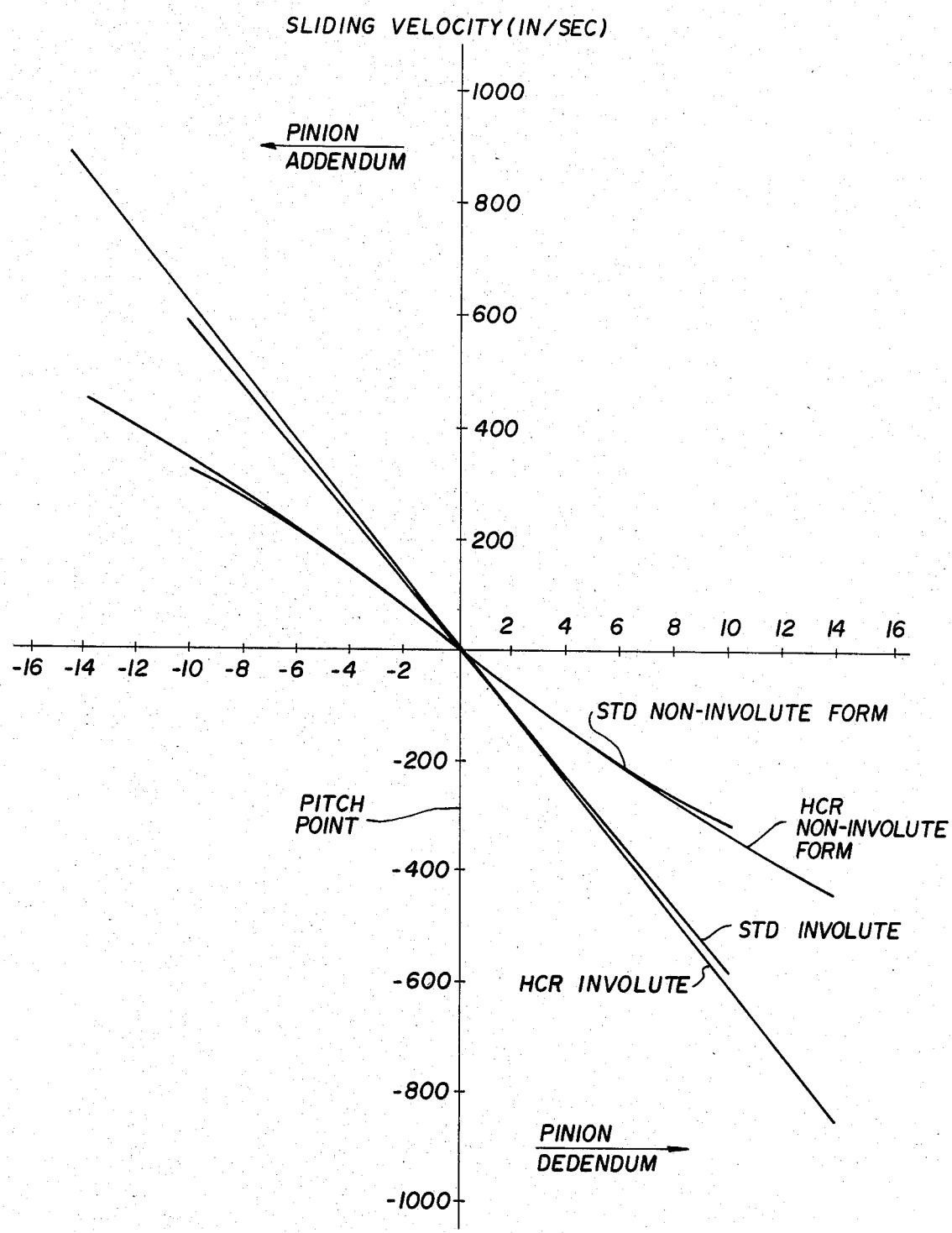
Figure 7:
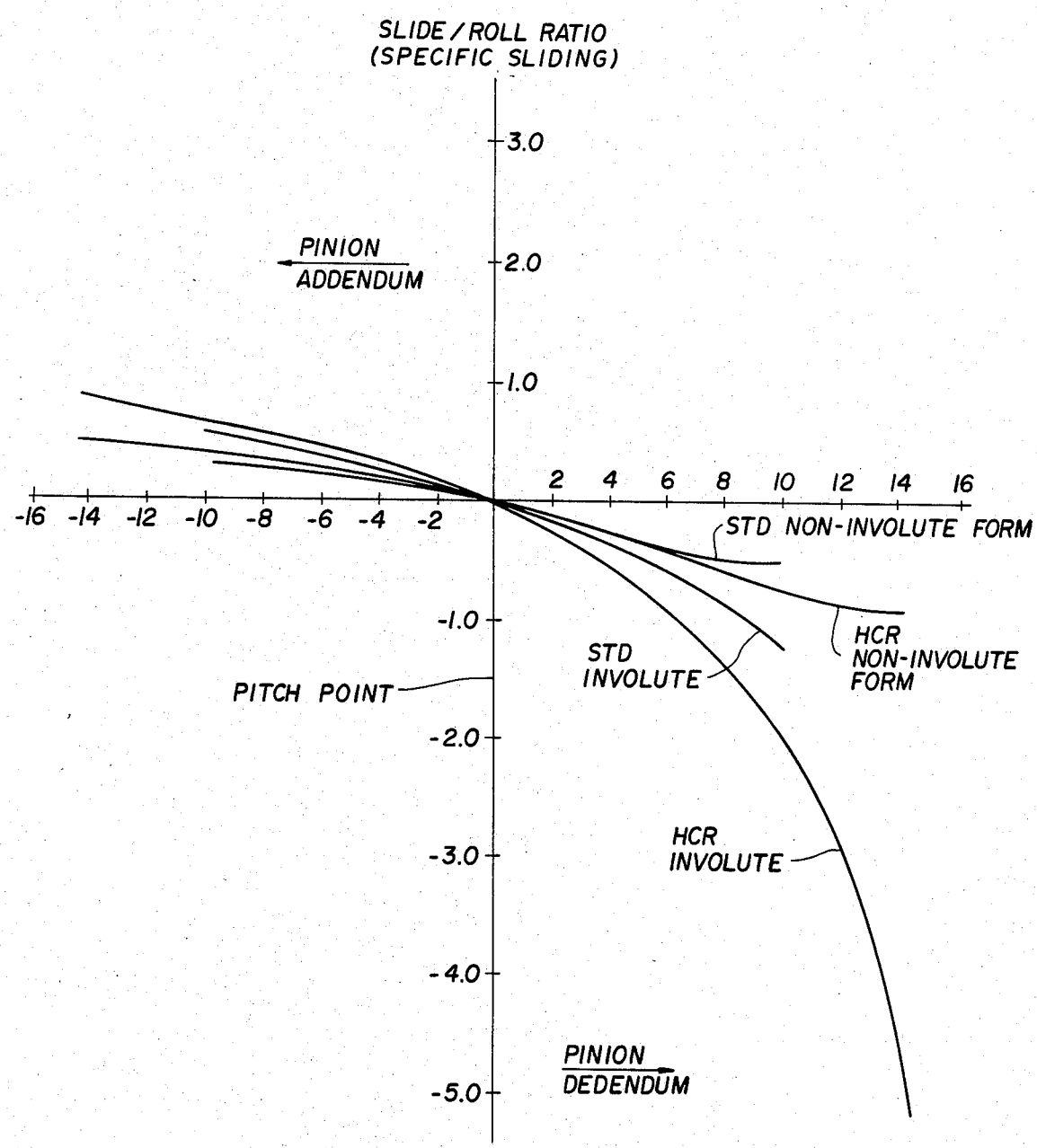

It has also been demonstrated that the sliding velocity of the (CRC)-(HCR) profile is dramatically improved over the involute profiles (FIG. 6). One of the disadvantages of a (HCR) profile, at least with respect to involute designs has been, as noted above, the higher sliding velocities. The (CRC) profile is an improvement in this respect. However, the improvement achieved with the (CRC)-(HCR) profile could not be expected because of the inherently poor sliding qualities of an extended length tooth form, which is characteristic of a high contact ratio profile. A similar result is shown in FIG. 7. The improvement in the sliding velocity of the (CRC)-(HCR) profile generally indicates a higher scoring load capacity, less heat generation.

Figure 8:
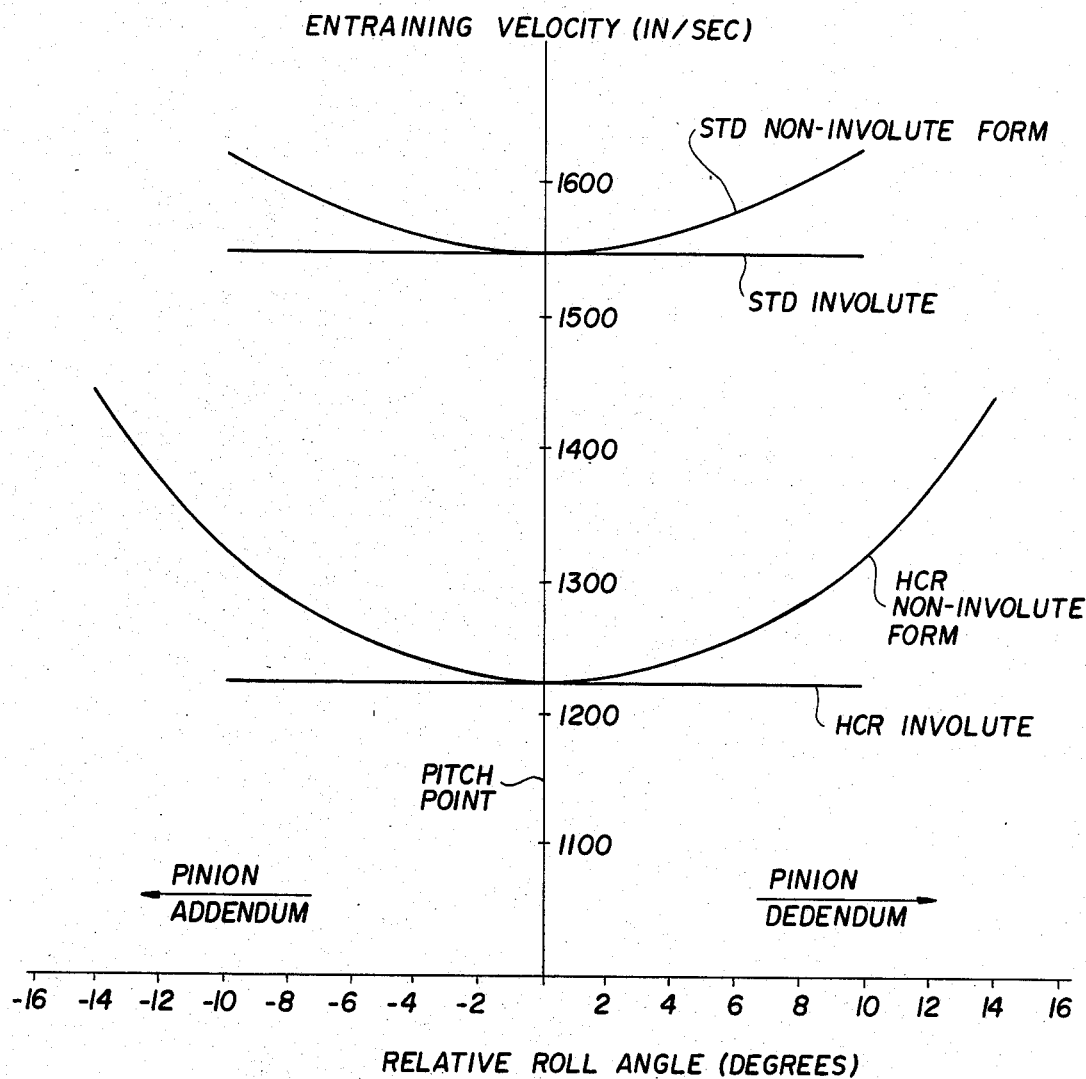

A decrease in the sliding velocity is of course, always beneficial. However, the full effect may not be realized if the entraining velocity is substantially reduced. The entraining velocity acts to generate an oil film which separates the mating surfaces while the sliding velocity acts to generate heat within the film and to reduce the film thickness. Hopefully, one would be pleased if the entraining velocity did not change when going from the standard to a non-involute profile. In fact the (CRC)-(HCR) profile produces an increase in the entraining velocity, as is shown in FIG. 8. This increase in entraining velocity coupled with a reduction in the sliding velocity will yield a substantial improvement in load capacity.

In generating the graphs of FIGS. 5-8, the gears tested had the following parameters:
(1) pinion teeth 28;
(2) gear teeth 28;
(3) pitch diameter = 3.5 inches;
(4) material CVM SAE 9310 (AMS 6265C) case carburized a surface hardness of Rc 62±2 and to a case depth consistent with tooth pitch and AGMA standards;
(5) 15000 rpm;
(6) load on gears to a maximum Hertz stress of 250,000 psi; and
(7) MIL-L-23699 type lubricant at a flow rate of not less than one gallon per minute while maintaining the inlet oil temperature at 200°±5° F.

Under load gear teeth roll and slide against each other with high contact pressures which can lead to the development of surface pits or spalls after many repetitions of the loading cycle. As is the case with tooth breakage, the ability of a given gear design to resist failure by pitting and/or spalling depends upon the maximum surface stress developed on a single tooth, its point of application and the gear material. In addition to tooth breakage and pitting, which are both fatigue type failures, high speed gears, particularly those lubricated with synthetic oils, are subject to scoring. Scoring is the rapid deterioration of a tooth surface due to the alternate welding together and tearing apart of the mating profiles caused by a breakdown of the oil film separating the surfaces. Although scoring resistance is dependent on lubricant properties to a greater extent than pitting and spalling, loading conditions and gear material are the prime candidates for improvement if the lubricant is a constant factor. Scoring is not a fatigue phenomenon, it will generally occur within a very short running time at the critical load condition.

Only small improvements have been made in recent years in developing standard involute gear teeth to carry the high loads applied to them in critical load applications. However, the application of the (CRC)-(HCR) profile promises to provide major improvements in the load capacity parameters, bending strength, surface durability and scoring resistance. Also, the maximum reduction ratio which may be obtained from a standard involute gear set is often limited by minimum tooth number considerations. This occurs because undercutting on involute pinions results at low tooth numbers since the active profile cannot extend below the base circle. The (CRC)-(HCR) profile overcomes this problem. Finally, where noise is a consideration, recourse is often made to helical, herringbone (parallel axis) or spiral level (intersecting axis) gears in order to improve the contact ratio and thus reduce the noise level. Unfortunately, thrust loads are also introduced into the system, thus additional weight and complexity are also added. Since (CRC)-(HCR) gears may be made as spurs (0° helix) this thrust component may be eliminated. (CRC)-(HCR) gears may also be made helical or spiral bevel, if desired.

Figure 9:
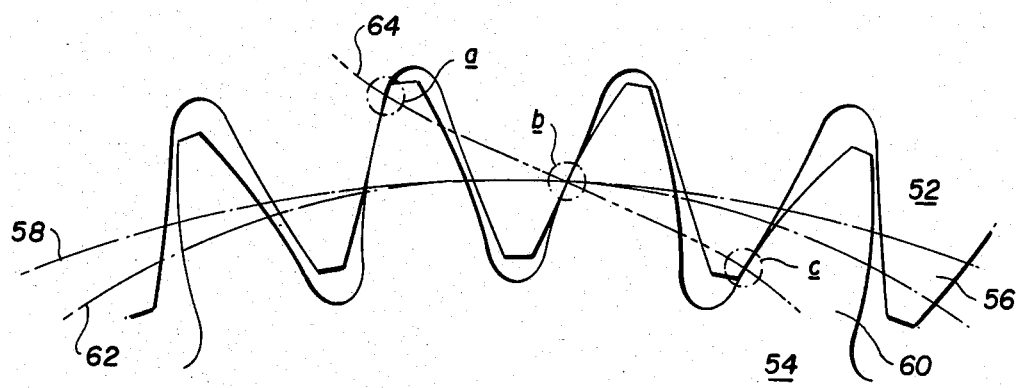
FIG. 9, which schematically illustrates a pair of meshing gears, one of which is an internal gear of (CRC)-(HCR) profile.

The gears with the (CRC)-(HCR) profile discussed above are external gears. The (CRC)-(HCR) profile can also apply to internal gears as well. FIG. 9, illustrates an internal gear 52 in mesh with a gear 54, both of which possess (CRC)-(HCR) profiles. The gear 52 includes teeth 56 and a pitch circle 58, while the gear 54 includes teeth 60 and a pitch circle 62. The path of contact 64 is similar to path of contact 50 of FIG. 3.

What is claimed is:

1. A gear set comprising a pair of mating gears having conjugate gear teeth, the profile of said gear teeth having substantially constant relative curvature (CRC) at all points of contact and a high profile contact ratio (HCR) of at least 2.

2. The gear set as defined in claim 1, wherein the relative radius of curvature of the (CRC)-(HCR) profile increases for increasing relative roll angle.

3. The gear set as defined in claim 1, wherein the sliding velocity of the (CRC)-(HCR) profile is less than for a pair of mating gears having an involute profile and a contact ratio of at least 2.

4. The gear set as defined in claim 1, wherein the entraining velocity of the (CRC)-(HCR) profile is greater than for a pair of mating gears having an involute profile and a contact ratio of at least 2.

5. The gear set as defined in claim 1, wherein the profile is defined by the equations:

$$\sin \phi = \sum_{m=0}^{\infty} (a_n \sigma^{-n}) \quad (1)$$

$$mp = \frac{\theta_{clc} - \theta_{cod}}{\frac{360°}{N}} \quad (2)$$

where:
$\phi$ = pressure angle at the pitch contact point
$mp$ = contact ratio
$\phi_{clc}$ = roll angle at the last point of contact of the (CRC) profile
$\theta_{cod}$ = roll angle at the outside diameter of the (CRC) profile
$N$ = number of teeth.

* * * * *